United States Patent [19]
Belmares-Sarabia et al.

[11] Patent Number: 4,866,511
[45] Date of Patent: Sep. 12, 1989

[54] COLOR CORRECTION SYSTEM WITH COLOR LEVEL MODIFICATION AND CORRESPONDING METHOD

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[21] Appl. No.: 179,168

[22] Filed: Apr. 8, 1988

Related U.S. Application Data

[63] Continuation-in-part of Ser. No. 942,901, Dec. 17, 1986, abandoned, Ser. No. 943,218, Dec. 17, 1986, abandoned, and Ser. No. 943,298, Dec. 17, 1986, Pat. No. 4,763,186, each is a continuation-in-part of Ser. No. 851,164, Apr. 14, 1986, abandoned, which is a continuation-in-part of Ser. No. 598,468, Apr. 9, 1984, Pat. No. 4,679,067.

[51] Int. Cl.$^4$ .............................................. H04N 9/68
[52] U.S. Cl. ...................................... 358/27; 358/28; 358/80
[58] Field of Search .................................. 358/27, 80

[56] References Cited

U.S. PATENT DOCUMENTS

| | | | |
|---|---|---|---|
| 3,588,321 | 6/1971 | Bruch | 358/28 |
| 3,737,561 | 6/1973 | Boer | 358/27 |
| 3,787,611 | 1/1974 | Poetsch et al. | 358/27 |
| 3,875,583 | 4/1975 | Poetsch et al. | 358/27 |
| 4,307,412 | 12/1981 | van den Bussche | 358/27 |
| 4,733,295 | 3/1988 | Hemsky et al. | 358/80 |

Primary Examiner—John W. Shepperd
Attorney, Agent, or Firm—Curtis, Morris & Safford

[57] ABSTRACT

Improved color correction apparatus, systems, and methods are disclosed. Such an apparatus may include a control signal circuit and a color level correction circuit. The control signal circuit is responsive to luminance signals. Additionally, the control signal circuit establishes a plurality of luminance ranges, which overlap one another, and produces a plurality of control signals. The different control signals are associated with the different luminance ranges. Each of the control signals is a different function of the luminance signal. The color level correction circuit is responsive to the control signals produced by the control signal circuit. The color level correction circuit is preferably responsive to color difference signals, too. The color level correction circuit selectively develops color level correction signals based upon the control signals provided by the control signal circuit. The apparatus further includes a circuit for applying the color level correction signal to the color signals. Each of the control signals produced by the control signal circuit is advantageously a different smoothly varying function of the luminance signal and is nonzero over a substantially full spectrum of luminance levels. A system may be provided with equipment for controlling a video signal source, such as a telecine, based upon a plurality of simultaneously displayed video pictures. The simultaneously displayed video pictures may be used to position the image recording medium in the video signal source so that a particular image, which corresponds to a selected one of the simultaneously displayed video pictures, is properly aligned in the video signal source to produce the instantaneous video picture.

35 Claims, 10 Drawing Sheets

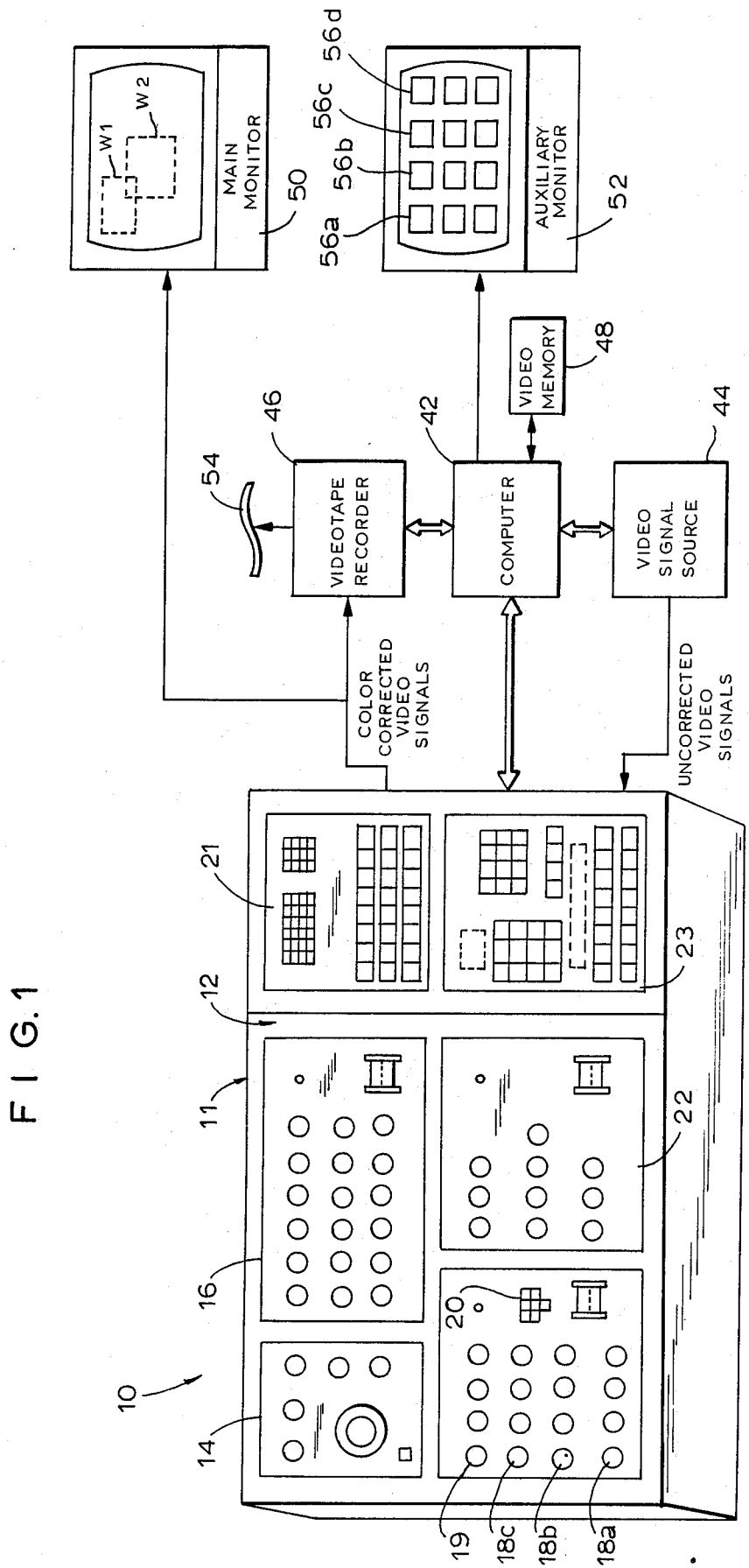
F I G. 1

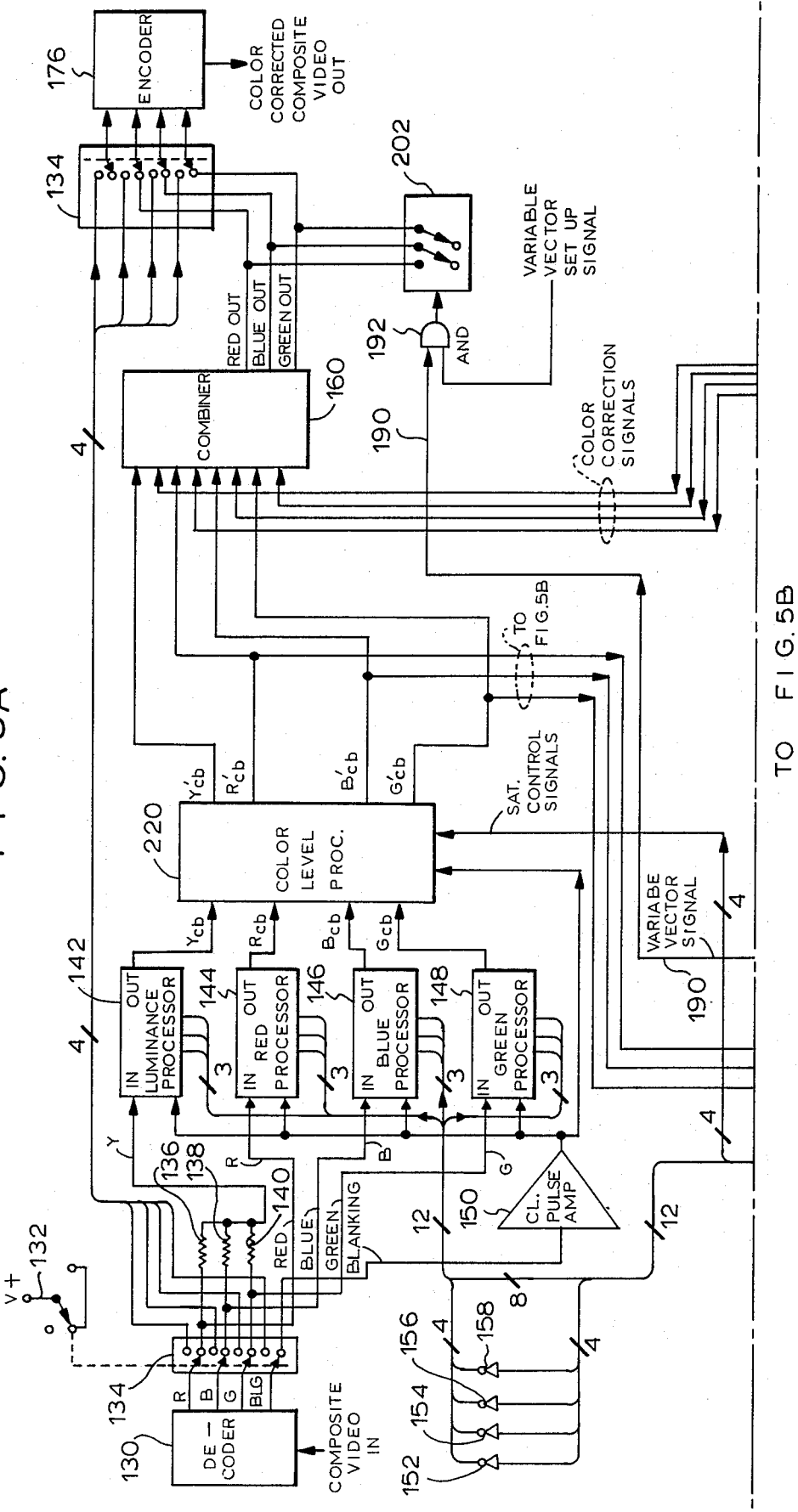

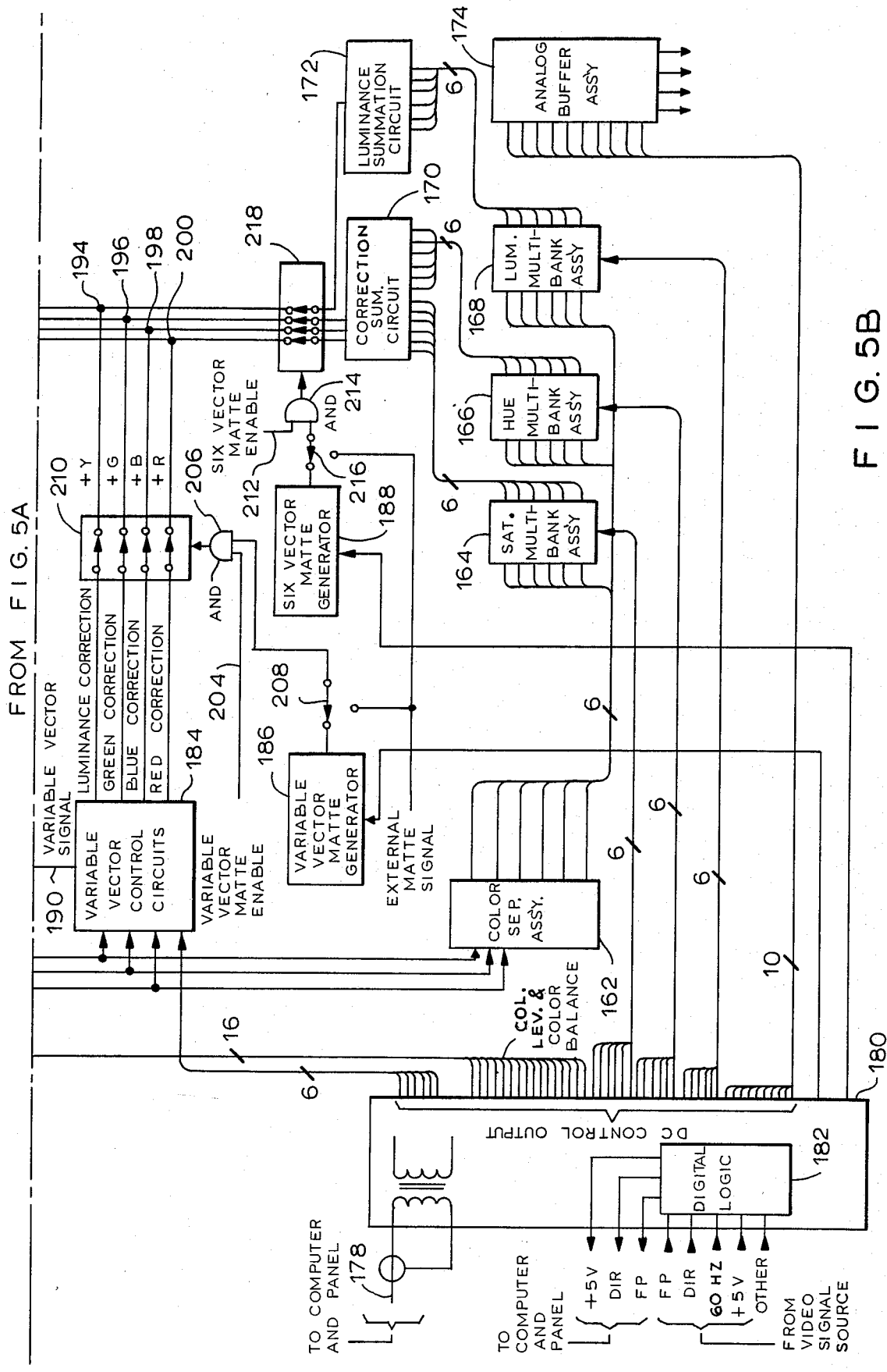

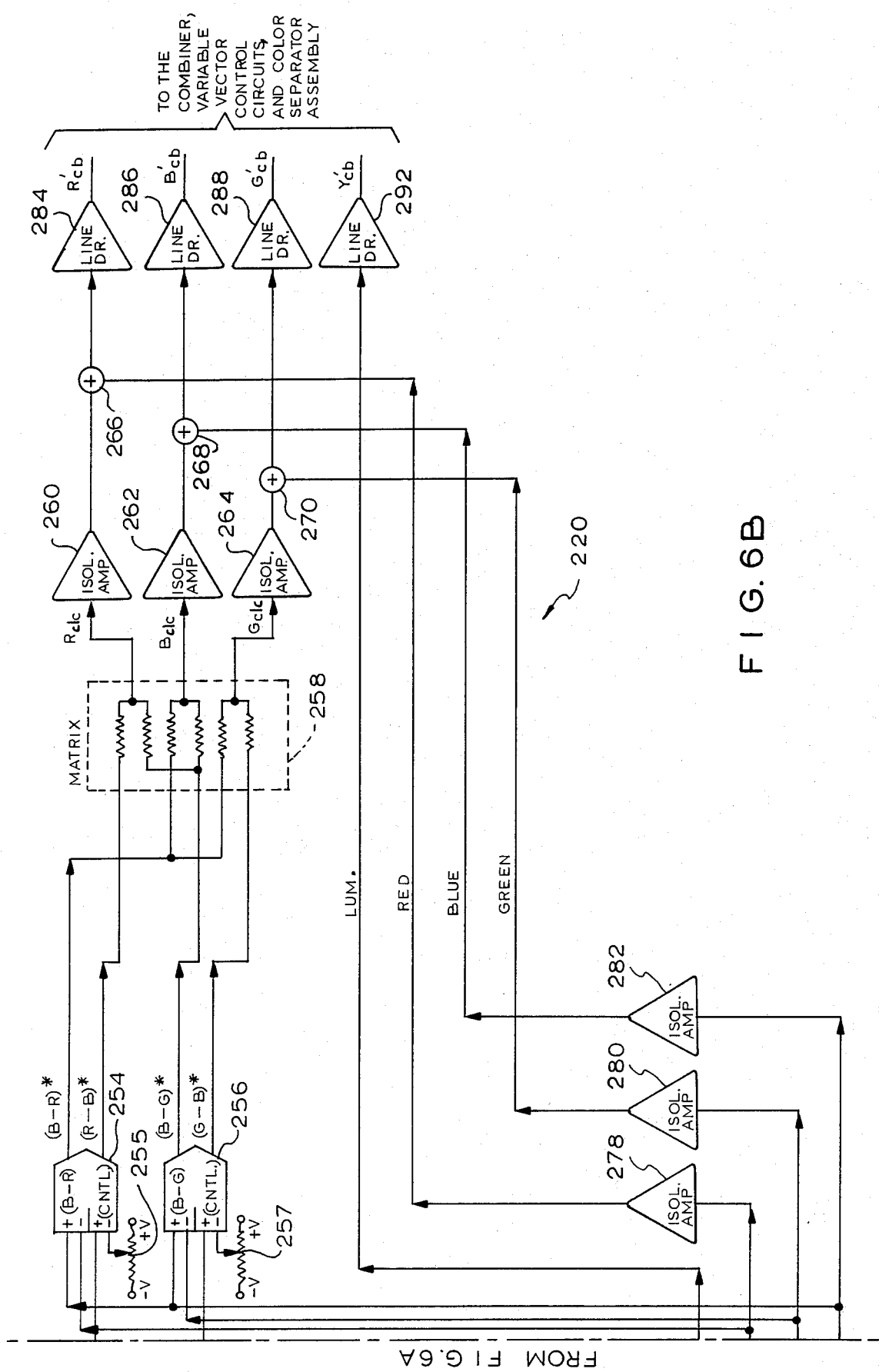

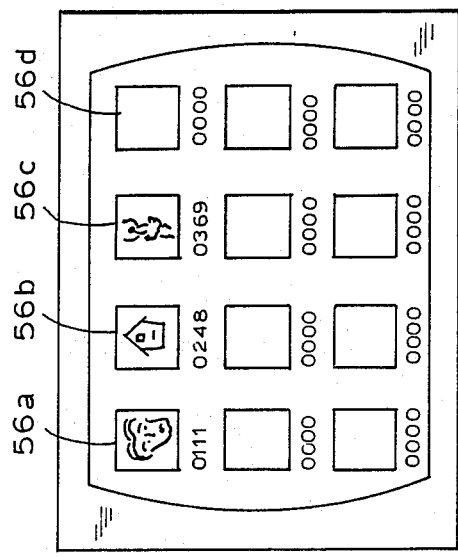
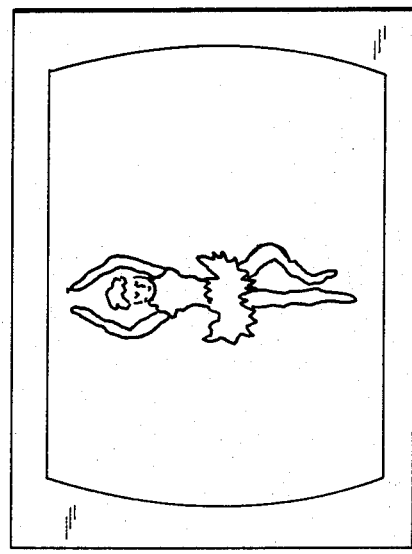
8A
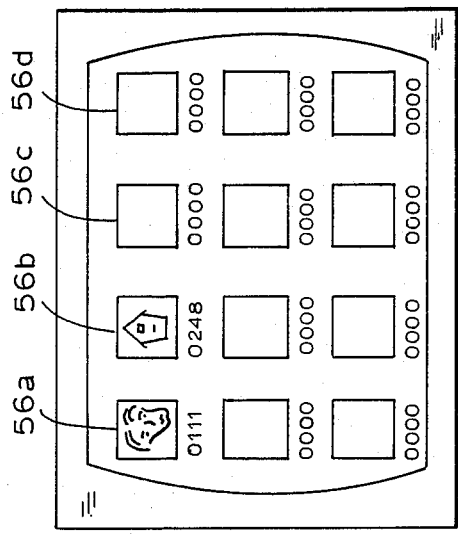
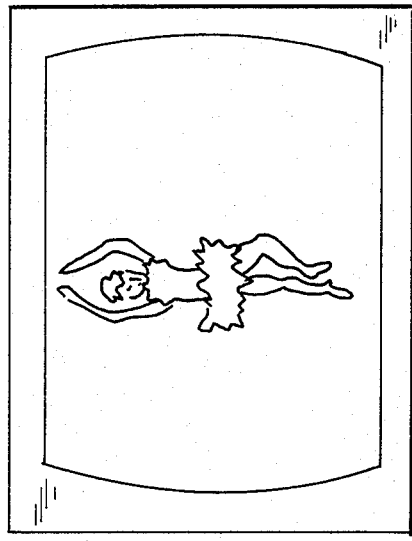
8B
FIG. 8

COLOR CORRECTION SYSTEM WITH COLOR LEVEL MODIFICATION AND CORRESPONDING METHOD

CROSS REFERENCE TO RELATED APPLICATIONS

This application is continuation-in-part of application Ser. Nos. 942,901 now abandoned, 943,218 now abandoned, and 943,298 now U.S. Pat. No. 4,763,186, which were filed on Dec. 17, 1986. These three applications were each a continuation-in-part of application Ser. No. 851,164, which was filed on Apr. 14, 1986 now abandoned. Application Ser. No. 851,164 was a continuation-in-part of application Ser. No. 598,468, which was filed on Apr. 9, 1984, and which issued as U.S. Pat. No. 4,679,067 on July 7, 1987.

BACKGROUND OF THE INVENTION

The invention relates to systems and methods for color correcting video picture signals. More particularly, the invention pertains to improved systems and methods for increasing the quality and speed of color correction operations.

This patent application describes improvements upon the color correction systems and methods disclosed in U.S. Pat. Nos. 4,096,523 (the "Rainbow" patent); 4,223,343 (the "Anamorphic" patent); 4,410,908 (the "Luminance" patent); 4,679,067; and 4,694,329; as well as those disclosed in commonly owned U.S. patent application Ser. Nos. 807,815, entitled "Editing System and Method" ; 851,164, entitled "Color Correction System and Method" ; 942,901, entitled "Color Correction System and Method" ; 943,218, entitled "Color Correction System With Traveling Matte and Corresponding Method"; and 943,298, entitled "Color Correction System With Monitor for Use in Recalling Color Corrections and Corresponding Method." The disclosures of these patents and patent applications are hereby incorporated herein by reference.

There is a continuing need to improve the efficiency, speed, and quality of the color correction of video picture signals, especially in film-to-tape and tape-to-tape transfers, and particularly in scene-by-scene color correction. For instance, there is a need to modify the amount of color in a color balanced video picture. Furthermore, there is a need to alter the color level in video pictures without affecting black, gray, and white picture areas. In addition, there is a need for more convenient controls for video signal sources, such as telecines.

OBJECTS OF THE INVENTION

Accordingly, an object of the invention is to satisfy the above needs and provide a system and a method for color correcting video picture signals with increased efficiency, speed, and quality.

Another object of the invention is to provide an apparatus and a method for improving the ability to selectively modify the amount of color in video pictures.

An additional object of the invention is to provide an apparatus and a method for more easily controlling a video signal source and accurately positioning the image recording medium in the video signal source.

A further object of the invention is to provide an apparatus and a method for establishing the amount of color information independently of the color balance for video pictures.

Yet another object of the invention is to provide an apparatus and a method for improving the ability to adjust the color level of color signals with certain luminance levels.

An additional object of the invention is to provide an apparatus and a method for selectively setting the color level of color signals with luminance levels in a particular luminance range or in all luminance ranges.

Another object of the invention is to provide improved correction signals without employing level comparators or threshold detectors, thus avoiding drastic signal transitions that would produce an unnatural and unpleasing video picture.

An additional object of the invention is to provide an apparatus and a method with an improved capability to correct for color nonlinearities in motion picture film.

SUMMARY OF THE INVENTION

The invention satisfies the needs identified above and meets the foregoing objects by providing an apparatus for correcting video picture signals that contain luminance and color signals, which apparatus includes a control signal circuit and a color level correction circuit. The control signal circuit is responsive to luminance signals. Additionally, the control signal circuit establishes a plurality of luminance ranges, which overlap one another, and produces a plurality of control signals. The different control signals are associated with the different luminance ranges. Each of the control signals is a different function of the luminance signal. The color level correction circuit is responsive to the control signals produced by the control signal circuit. The color level correction circuit is preferably responsive to color difference signals, too. The color level correction circuit selectively develops color level correction signals based upon the control signals provided by the control signal circuit. The apparatus further includes a circuit for applying the color level correction signals to the color signals. Each of the control signals produced by the control signal circuit is advantageously a different smoothly varying function of the luminance signal and is nonzero over a substantially full spectrum of luminance levels.

The control signal circuit may comprise three function generators. The first function generator has a transfer function corresponding to a high luminance range. The second function generator has a transfer function corresponding to a middle luminance range. The third function generator has a transfer function corresponding to a low luminance range.

The apparatus advantageously includes equipment for producing a selectively adjustable overall level correction signal. If so, the color level correction circuit is constructed to respond to the overall level correction signal, and it generates color level correction signals based upon the overall level correction signal as well as the control signals provided by the control signal circuit.

Preferably, the color level correction circuit includes two multiplication devices. The first multiplication device modifies the sign and magnitude of a first color difference signal based upon the control signals, while the second multiplication device modifies the sign and magnitude of a second color difference signal based upon the control signals.

In accordance with another aspect of the invention, a color corrector includes a device for producing signals indicative of luminance and signals indicative of color.

The color corrector also includes a color level adjustment assembly, which is responsive to the luminance-indicative signals. The color level adjustment assembly selectively adjusts the levels of the color-indicative signals as a function of the luminance-indicative signals to produce level-corrected color signals. The color corrector further includes color correction circuits, which are connected to receive the level-corrected color signals, and which selectively generate color correction signals for the level-corrected color signals. The color corrector also has a device for adding the level-corrected color signals and the color correction signals. Such a color corrector may be operated on a scene-by-scene basis.

In accordance with a further aspect of the invention, a color corrector includes a device for producing signals indicative of luminance and signals indicative of color. The color corrector also includes a color level adjustment assembly, which selectively adjusts the levels of all color-indicative signals regardless of the levels of the luminance-indicative signals to produce level-corrected color signals. The color corrector further includes color correction circuits, which are connected to receive the level-corrected color signals, and which selectively generate color correction signals for the level-corrected color signals. The color corrector also has a device for adding the level-corrected color signals and the color correction signals. Such a color corrector may be operated on a scene-by-scene basis.

In accordance with an additional aspect of the invention, a system and a method are provided for controlling a video signal source, such as a telecine, based upon a plurality of simultaneously displayed video pictures. The simultaneously displayed video pictures may be used to position the image recording medium in the video signal source to a particular location which is related to a selected one of the simultaneously displayed video pictures.

The features of the invention each increase the efficiency of the color correction process. In addition, when one or more of these features is used with conventional features, even greater efficiency results, such efficiency previously being unattainable.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein:

FIG. 1 is a diagrammatic illustration of a color correction system according to the invention;

FIGS. 5A-5B are a block diagram of the color correction circuits in a color correction system according to the invention;

FIGS. 6A-6B are a block diagram of the color level processor for the color correction circuits illustrated in FIGS. 5A-5B;

FIGS. 8A-8B are enlarged views of the auxiliary monitor and the main monitor for the color correction system shown in FIG. 1.

DETAILED DESCRIPTION OF THE PREFERRED EMBODIMENTS

General Description

Figure 2:
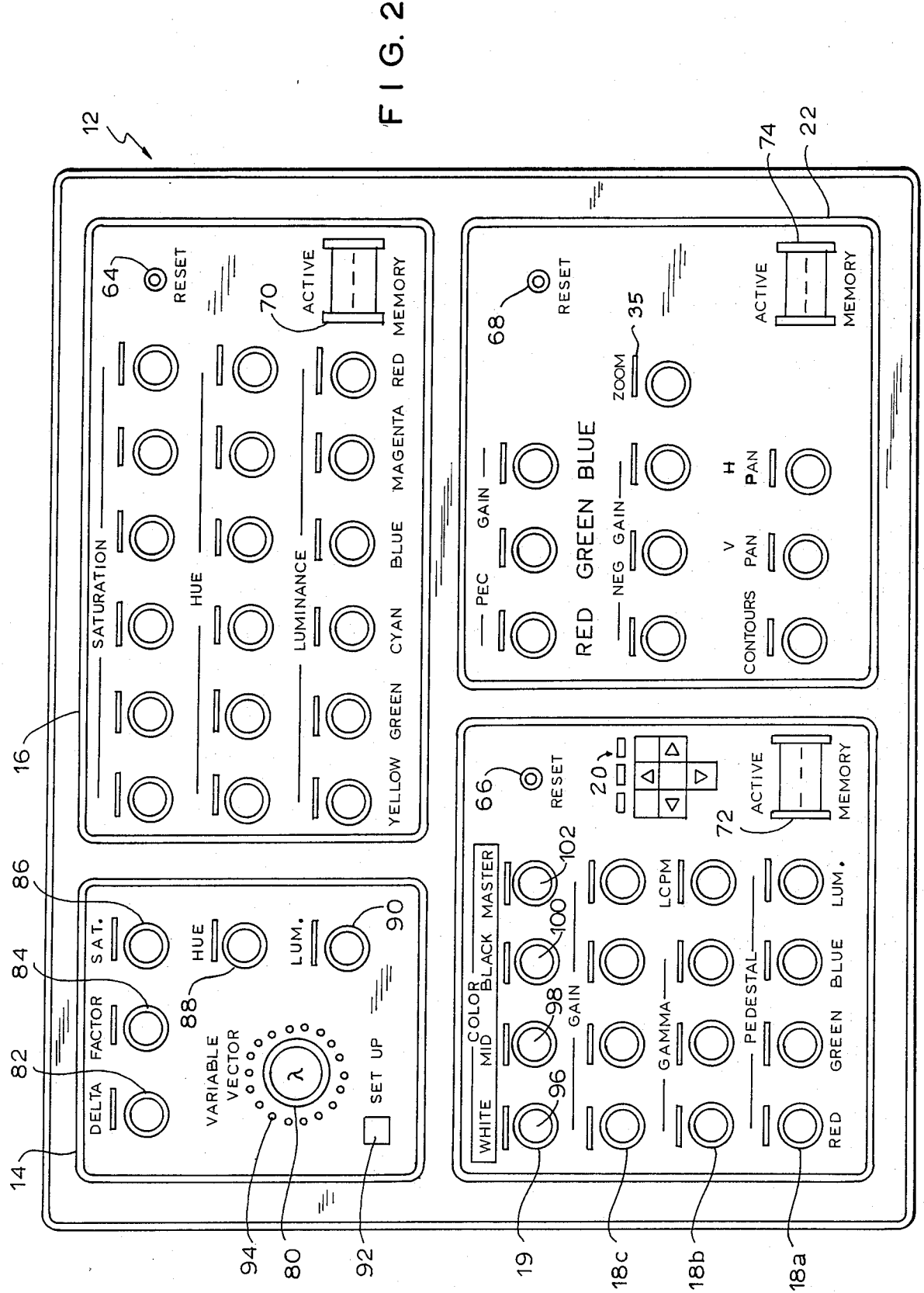
FIG. 2 is a top plan view of a portion of the front panel for the color corrector shown in FIG. 1.

FIG. 1 shows a color correction system 10 constructed according to the invention. The color correction system 10 includes a color corrector 11 having a front panel 12. Sections of the front panel 12 are illustrated in greater detail in FIGS. 2-4. The front panel 12 has a set of variable vector controls 14 and a set of six vector controls 16. The six vector controls 16 function as outlined in the Rainbow and Luminance patents.

Referring now to the lower left-hand region of FIG. 2, the front panel 12 includes a set of color balance controls 18a-18c, a set of color level controls 19, and "window" controls 20. The "window" controls 20 are described and depicted in greater detail in U.S. Pat. Nos. 4,679,067 and 4,694,329. The front panel 12 additionally includes video signal source controls 22. The video signal source controls 22 adjust parameters such as the PEC gain and negative gain for each of the red, green, and blue channels. Moreover, the video signal source controls 22 adjust other parameters, for instance, the horizontal pan, the vertical pan, the zoom, and the contours. Each of the controls in the sets of controls 14, 16, 18, 19, and 22 includes a control knob which is coupled to a shaft-position encoder, as described in U.S. Pat. Nos. 4,679,067 and 4,694,329.

As illustrated in FIG. 1, the right side of the front panel 12 includes pushbuttons and displays, designated generally by the reference numerals 21 and 23. The sections 21 and 23 of the front panel 12 are depicted in greater detail in FIGS. 3 and 4, respectively. The section 23 of the front panel includes two rows of pushbuttons 24a-24b, which are shown with suitable legends in FIG. 4, while the section 21 of the front panel includes three rows of pushbuttons 26a-26c, which are illustrated with appropriate legends in FIG. 3. The functions of many of these pushbuttons are described in the Rainbow and Luminance patents. A display 28 (FIG. 4) shows the scene number (or frame count) for the corrections stored in the A buffer and the B buffer. Moreover, the display 28 shows the scene number (or frame count) for the current scene.

Figure 4:
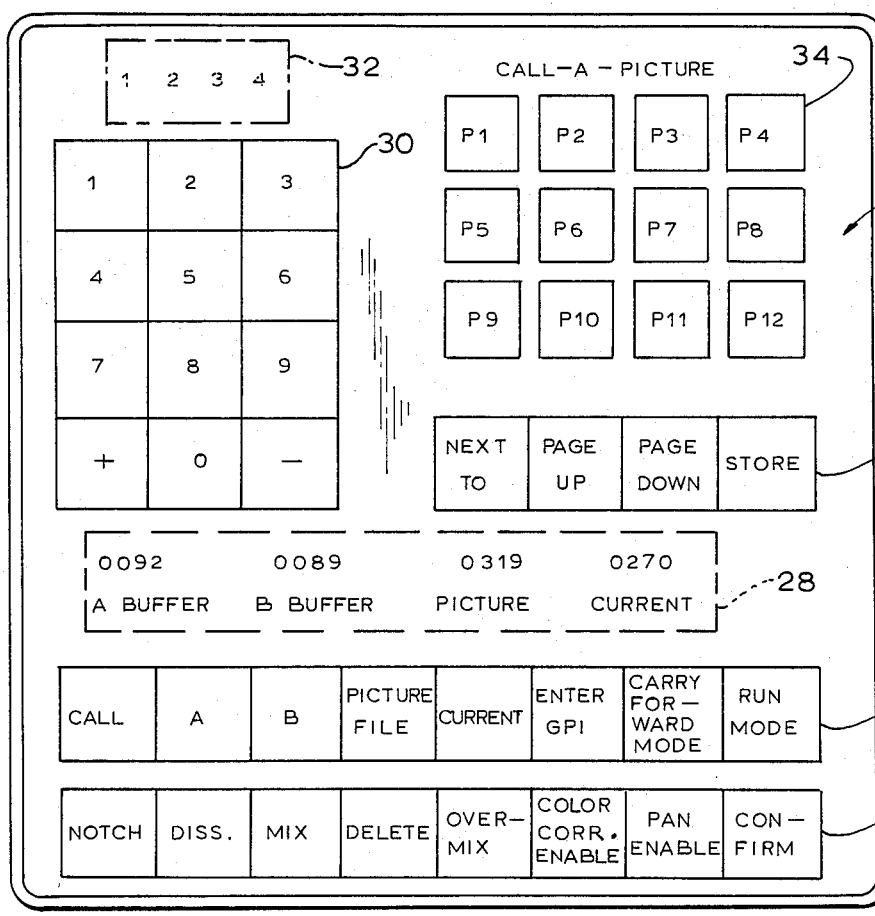
FIG. 4 is a top plan view of yet another portion of the front panel for the color corrector shown in FIG. 1.

Referring to FIG. 4, a keypad 30 and a display 32 are used to recall the corrections for a particular scene and apply them to the present scene. For example, if the operator wanted to use the corrections from scene number 1,234 for the current scene, the operator would press the "call" pushbutton in row 24a and then the buttons 1, 2, 3, and 4 of the keypad 30 in this sequence in order to recall the desired corrections. In addition, corrections may be recalled by entering a frame count with the keypad 30.

FIG. 4 shows an array 34 of pushbuttons P1-P12, which are referred to as picture buttons, and a row of pushbuttons 36. The picture buttons P1-P12 are utilized with the "Call-A-Loc" and "Call-A-Picture" features of the color corrector. The "Call-A-Loc" feature is discussed below. The "Call-A-Picture" feature is used for recalling correction signals for previous scenes and is described in U.S. patent No. (to be issued from application Ser. No. 943,298).

Figure 3:
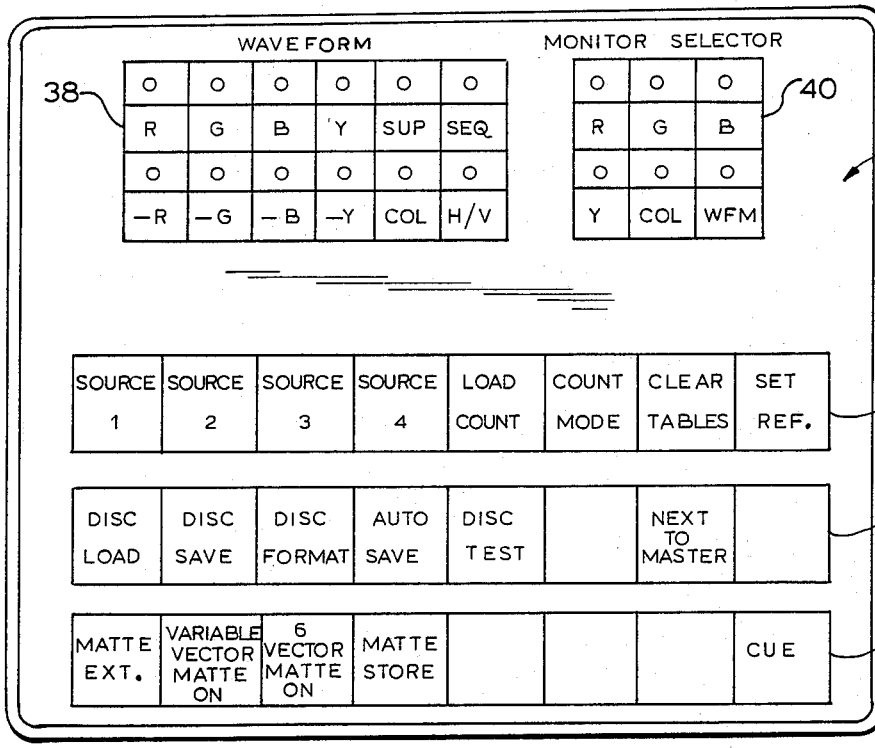
FIG. 3 is a top plan view of another portion of the front panel for the color corrector shown in FIG. 1.

The section of the front panel 12 shown in FIG. 3 has waveform pushbuttons and indicators 38 for selecting various waveforms for viewing on an oscilloscope (not shown). This section also has monitor selector pushbuttons and indicators 40 for selecting various signals for monitoring.

Referring again to FIG. 1, the system 10 has a computer 42, which is connected to each of the color corrector 11, a video signal source 44, a videotape recorder 46, and a video memory 48. The video signal source 44 may be a film chain or telecine, a videotape player, or the like. The video signal source 44 produces video signals from the associated image recording medium. These video signals are delivered to the color corrector 11 so that they can be corrected. The color corrector 11 provides correction signals for the video signals from the video signal source 44 under the direction of the operator and the computer 42, and it produces corrected video signals. The corrected video signals are sent to a main monitor 50, and, at the appropriate time, to the videotape recorder 46. The operator may observe the effect of the correction signals on the video signals by looking at the video picture on the main monitor 50. The videotape recorder 46 records the corrected video signals on a videotape 54, usually during a second run after corrections have been made during a first run, thereby producing a corrected videotape.

The main monitor is shown with the windows W1 and W2. The use of the windows W1 and W2, which are movable in size and/or position, is described in application Ser. No. 851,164 and application Ser. No. 943,218.

An auxiliary monitor 52 is connected to the computer 42. The auxiliary monitor 52 displays a plurality of video pictures, such as the video pictures 56a–56d. One function of the auxiliary monitor 52 and the video memory 48 is described in U.S. patent No. (to be issued from application Ser. No. 943,298). Another function of the auxiliary monitor 52 and the video memory 48 is explained below during the discussion of the "Call-A-Loc" feature.

Looking now at FIG. 2, above each of the control knobs in the sets of controls 14, 16, 18, 19, and 22 is a horizontal linear group 35 of four light-emitting diodes ("LEDs"), which are referred to as "rangefinder" LEDs. The two inner LEDs of each group 35 are green, while the two outer LEDs are red. When the associated control knob is in its center position, the two inner LEDs are energized. If the control knob is turned to the right, the two inner LEDs are deenergized and the rightmost LED is energized. Correspondingly, if the control knob is turned to the left, the two inner LEDs are deenergized, and the leftmost LED is energized. Accordingly, the operator may quickly determine the position of any of the control knobs.

Reset buttons 64, 66, and 68, are provided to permit the operator to readily center the control knobs in the sets of controls 16, 18–19, and 22, respectively. Specifically, when the operator presses a reset button, all of the control in the associated set of controls are electronically centered by zeroing the counter connected to the control knob. The controls 16, 18–19, and 22 include active/memory pushbutton-indicators 70, 72, and 74, respectively.

Referring now to the lower part of FIG. 4, and specifically to the pushbuttons in the lower row 24b, the "notch" pushbutton sets the scene boundary between scenes; that is, pressing the "notch" pushbutton stores the frame number of the first frame of a new scene. The "color correct enable" pushbutton in the same row makes the "notch" pushbutton effective for correction events. The "pan enable" pushbutton makes the "notch" pushbutton effective for position related events, such as horizontal pans, vertical pans, and zooms.

The "carry forward mode" is entered by pressing the "carry forward mode" pushbutton in the upper row 24a. In this mode, the corrections from the last scene are carried forward for the next scene. That is, once the operator establishes boundary between that scene and the next scene, these corrections are both stored for the particular scene and applied to the next scene. Thus, the operator may use these corrections as a basis for correcting the next scene.

The "picture file" pushbutton in the upper row 24a is used with the "Call-A-Loc" feature as well as the "Call-A-Picture" feature of the color corrector. The "picture file" pushbutton enables the array of picture buttons P1–P12 (designated generally by the reference numeral 34) and the row of pushbuttons 36.

The "dissolve" pushbutton in the lower row 24b is used to produce a linear transition between the corrections for a given scene and the corrections for the subsequent scene. For example, the operator may make corrections for a given scene and then make corrections for the subsequent scene. If the operator wants a smooth transition between scenes, the operator presses the "dissolve" pushbutton at a frame near the end of the given scene and again presses the "dissolve" pushbutton at a frame near the beginning of the subsequent scene. The computer is programmed to automatically provide a linear transition, for instance, on a frame-by-frame basis, between the corrections for the given scene and the corrections for the subsequent scene for all frames between the two dissolve points.

Referring now to FIG. 3, the "source 1," "source 2," "source 3," and "source 4" pushbuttons in the upper row row 26a enable the operator to select one of a variety of video signal sources. For example, the operator may select a telecine as the video signal source by pressing the "source 1" pushbutton, or select a videotape player as the video signal source by pressing the "source 2" pushbutton.

The "load count" pushbutton (next to the "source 4" pushbutton) allows the frame counter to be initialized to any number at the beginning of a new job. The "count mode" pushbutton allows the operator to select among various counting modes for the frame counter, such as, counts by hours, minutes, seconds and film frames; or PAL video frames; or NTCS video frames.

The "matte ext," "variable vector matte on," "six vector matte on," and "matte store" pushbuttons in the lower row 26c are used with the "Traveling Matte" feature of the color corrector. The "Traveling Matte" feature is discussed in application Ser. No. 851,164 and application Ser. No. 943,218.

The "disc load," "disc save," "disc format," "auto save," and "disc test" pushbuttons in the middle row 26c are utilized to control an external storage device (not shown) for the computer, such as a floppy disc drive or a hard disc drive.

Still referring to FIG. 3, the "cue" pushbutton on the right-hand side in the lower row 26c is discussed below during the description of the "Call-A-Loc" feature of the color corrector. Briefly, however, the "cue" pushbutton is employed to control the video signal source and cause it to position the image recording medium to a desired image.

Variable Vector Controls

The upper left-hand region of FIG. 2 illustrates the set of variable vector controls 14. The controls 14 include a variable vector position control 80, a delta control 82, a factor control 84, a saturation control 86, a hue control 88, and a luminance control 90. Furthermore, the variable vector controls 14 include a "set up" pushbutton 92. A ring of LEDs 94 is located around the circumference of the angular orientation of the variable vector position control 80. The angular orientation of the variable vector position control 80 corresponds to one of the colors on a vectorscope. The functions of the various controls 80-92 are explained in U.S. patent No. (to be issued from application Ser. No. 943,298), as well as in application Ser. No. 851,164.

The saturation control 86 and the hue control 88 may be utilized to alter the saturation and the hue, respectively, of colors within the selected range of colors. Moreover, the luminance control 90 may be used to increase or decrease the brightness of colors within the selected range of colors. Of course, the luminance control 90, the hue control 88, and the saturation control 86 may be employed together to alter the associated parameters of the colors within the selected range of colors. The variable vector control knob 80 and the delta control knob 82 are utilized to set the selected range of colors. The factor control 84 is used to select those colors within the selected range of colors that have saturation levels either above or below a specified level.

Color Correction Circuit Block Diagram

FIGS. 5A and 5B together comprise a block diagram of the color correction circuit of the color corrector 11. The components 130 through 178 and their interconnections are described in detail in U.S. patent No. (to be issued from application Ser. No. 807,815) and that description will not be repeated here.

Referring now to FIG. 5B, the serial receiver 180 and the digital logic circuits 182 serve the same functions as described in U.S. patent No. (to be issued from application Ser. No. 807,815), but are modified to receive control signals for (i) the variable vector control circuits 184, (ii) the variable vector matte generator 186, (iii) the six vector matte generator 188, and (iv) the color level processor 220. The variable vector control circuits 184 are described in U.S. patent No. (to be issued from application Ser. No. 943,298).

The circuits for the variable vector matte generator 186 and the six vector matte generator 188 are shown and described U.S. Pat. Nos. 4,679,067 and 4,694,329. Specifically, four programmable counters may be employed for each of the matte generators 186 and 188. The counting information for each of the programmable counters is supplied by the computer 42 over the coaxial cable 178 to the serial receiver 180. The serial receiver then delivers corresponding signals to the matte generator circuits 186 and 188.

Figure 7A:
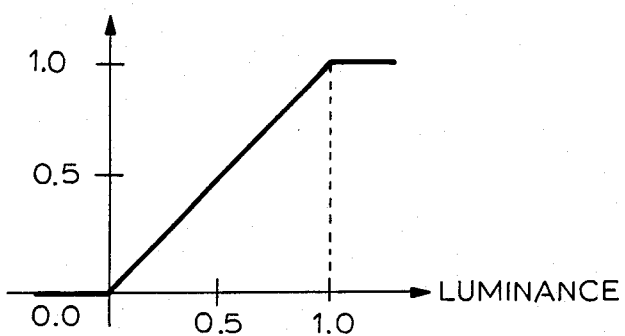
FIGS. 7A-7E are waveform diagrams of signals at various points in the circuit depicted in FIGS. 6A-6B.
Figure 7B:
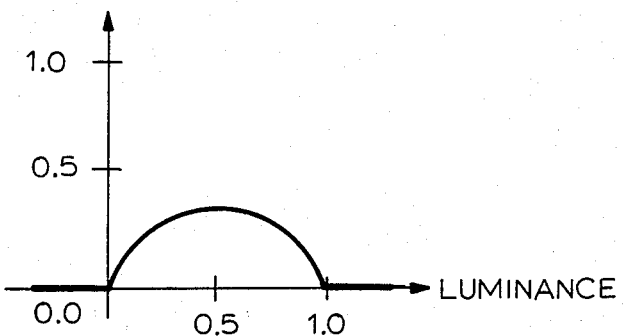

Unlike the color correction circuits shown in FIGS. 7A-7B of U.S. patent No. (to be issued from application Ser. No. 943,298), the color correction circuits depicted in FIGS. 5A-5B include a color level processor 220, which is illustrated in FIG. 5A, and which is fully explained below. The color level processor 220 is introduced into the circuit between the video signal processors 142-148 and the combiner 160. (Previously, the output signals from the circuits 142-148 were sent directly to the combiner 160, the color separator assembly 162, and the variable vector control circuits 184.) The color level processor 220 provides the operator with the added capability of adjusting the intensity of color signals depending upon the level of the associated luminance signal. Thus, the operator may modify the color level, i.e., saturation, of colors within one or more luminance ranges. Moreover, this unit enables the operator to vary the color level of all color signals regardless of the level of the associated luminance signal before color corrections are developed.

Heretofore, the controls 18a-18c (FIGS. 1 and 2) were employed to color balance video signals. These controls allow the operator to adjust the pedestal, gamma, and gain of the red, blue, green, and luminance signals. The controls 18a-18c affect the processing of video signals in the circuits 142-148 in a conventional manner. Now, however, the color level processor 220 allows the operator to further alter the signals supplied by the circuits 142-148. The controls 19 (FIGS. 1 and 2) are used to control the modification of video signals in the color level processor 220. Accordingly, the output signals from the color level processor 220 are designated $Y'_{cb}$, $R'_{cb}$, $B'_{cb}$, and $G'_{cb}$.

The output signals from the color level processor 220 are sent to the combiner 160 (FIG. 5A), the color separator assembly 162 (FIG. 5B), and the variable vector control circuits 184 (FIG. 5B). Thus, the correction signal generating circuits 162-172 and 184 receive color balanced and level corrected video signals.

In FIG. 5B, the saturation multibank assembly 164 is the circuitry operated by the six control knobs in the top row of knobs on the panel 16 in FIG. 2. Similarly, the hue multibank assembly 166 is controlled by the six control knobs in the middle row of the panel 16, and the luminance multibank assembly 168 is controlled by the six control knobs in the bottom row of the panel 16. As it is well known, each of the eighteen knobs on this panel controls a parameter for colors within a fixed sector of the color circle represented on a vectorscope screen. As explained in U.S. patent No. (to be issued from application Ser. No. 807,815), the combiner 160 includes circuits which add the color corrections to the color video signals. These summation circuits may be located in another circuit assembly, such as the variable vector control circuits 184.

The correction summation circuit 170 sums the signals it receives and produces correction signals for the red ("R"), blue ("B"), and green ("G") signals, while the luminance summation circuit 172 similarly generates a correction signal for the luminance ("Y") signal, as described in U.S. patent No. (to be issued from application Ser. No. 807,815). The magnitudes of the correction signals depend upon the levels of the D.C. control signals received from the serial receiver 180. Similarly, the variable vector control circuits 184 provide correction signals for the R, B, G, and Y signals, as described in U.S. patent No. (to be issued from application Ser. No. 943,298). The variable vector control circuits receive D.C. control signals from the serial receiver 180. The magnitudes of the correction signals for the R, B, G, and Y signals depend upon the levels of the associated D.C. control signals. The correction signals are denoted as the +R, +B, +G, and +Y signals in FIG. 5B.

The correction signals from the variable vector control circuits 184 are added to the correction signals from the correction summation circuit 170 and the luminance summation circuit 172 at points 194, 196, 198, and 200. The added correction signals are delivered to the combiner 160 (FIG. 5A), where they are combined with the and $R'_{cb}$, $B'_{cb}$, and $G'_{cb}$, and $Y'_{cb}$ signals from the color level processor 220 to produce color corrected R, B, and G signals. The color corrected R, B, and G signals are sent from the combiner 160 to an encoder 176, which produces a color corrected composite video signal. The color corrected composite video signal is sent to the main monitor 50 and the videotape recorder 46, as shown in FIG. 1.

Color Level Processor Block Diagram

Figure 6A:
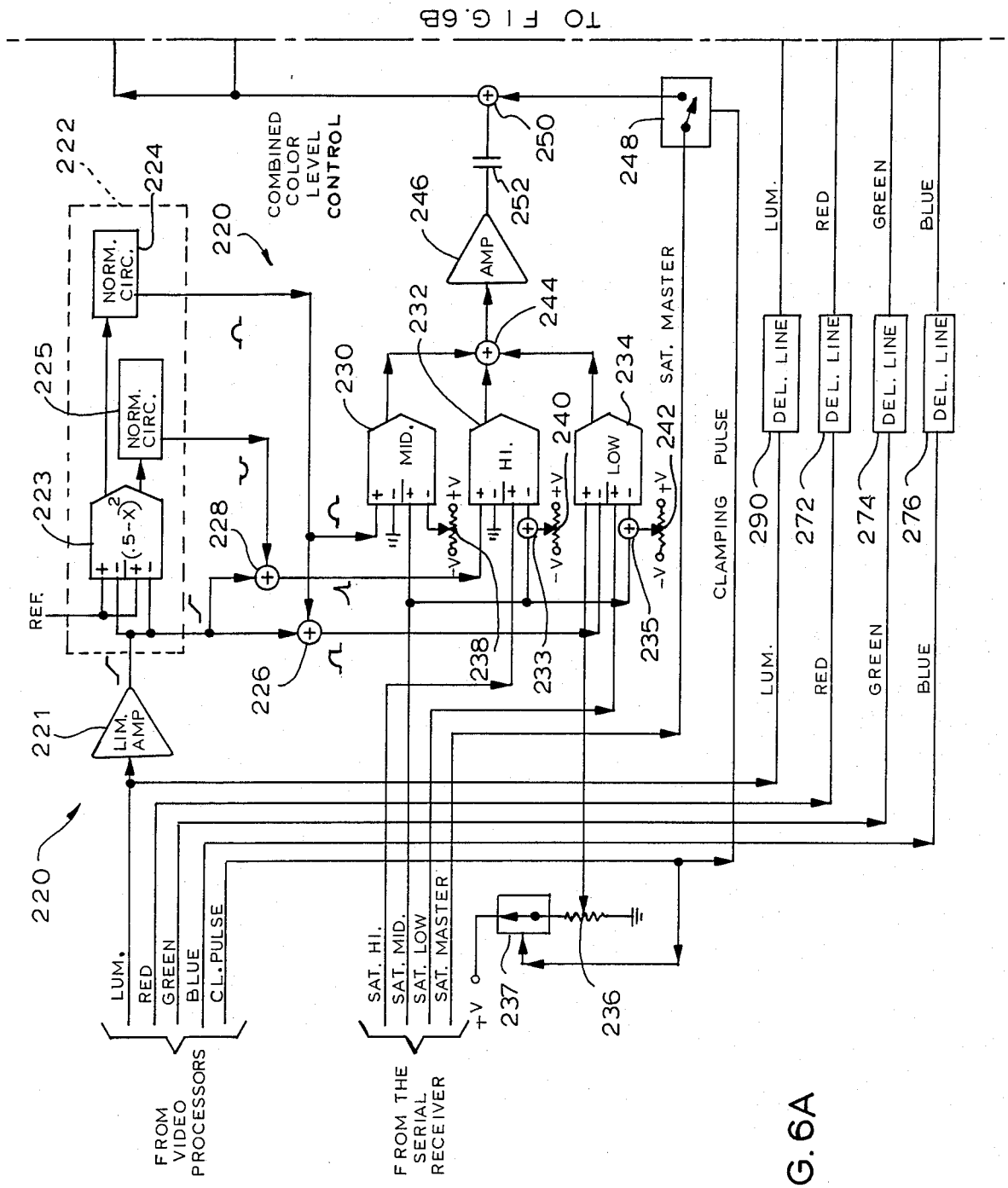

FIGS. 6A-6B are a block diagram of the color level processor 220. Referring to the upper left-hand corner of FIG. 6A, the luminance ("Y"), red ("R"), blue ("B"), and green ("G") signals are supplied to the color level processor 220 by the video signal processors 142-148 (FIG. 5A). In addition, the clamp pulse amplifier 150 (FIG. 5A) delivers the clamping pulse to the color level processor 220. Furthermore, the serial receiver 180 (FIG. 5B) sends four D.C. control signals to the color level processor 220. Specifically, the sat. high, sat. middle, sat. low, and sat. master signals are furnished by the serial receiver.

Each of these saturation or color level control signals is set by an associated control knob in the set of controls 19 (FIGS. 1 and 2) on the front panel 12. The set of controls 19 includes the control knobs 96-102 (FIG. 2). In particular, the position of the control knob 96 determines the polarity and magnitude of the sat. high signal. The position of the control knob 98 determines the polarity and magnitude of the sat. middle signal. The position of the control knob 100 determines the polarity and magnitude of the sat. low signal. Finally, the position of the control knob 102 determines the polarity and magnitude of the sat. master signal. Alternatively, the computer 42 (FIG. 1) may set the sat. high, sat. middle, sat. low, and sat. master signals based upon stored correction signals.

As depicted in FIG. 6A, a limiting amplifier 221, a squaring circuit 222, and the summation circuits 226-228 are used to establish three luminance ranges: a high range, a middle range, and a low range. Output signals from the squaring circuit 222 and the summation circuits 226-228 are combined with D.C. control signals (i.e., the sat. high, sat. middle, and sat. low signals) by the four-quadrant multipliers 230-234 to develop a color level control signal. The way in which these circuits cooperate is discussed below.

The limiting amplifier 221 limits the incoming luminance signal to a predetermined range of values. That is, the limiting amplifier 221 prevents its output signal from increasing above an upper limit or decreasing below a lower limit. For purposes of explanation, the limiting amplifier 221 may be thought of as restricting the incoming luminance signal to values between 0.0 and 1.0. FIG. 7A illustrates the output signal from the limiting amplifier 221 as a function output signal varies linearly with the luminance signal between the values 0.0 and 1.0.

The output signal from the limiting amplifier 221 is subtracted from a reference signal at each of the inputs of a four-quadrant multiplier 223, which is part of the squaring circuit 222. For purposes of explanation, the reference signal has a value of 0.5. The four-quadrant multiplier 223 squares the difference between the reference signal and the output signal from the limiting amplifier 221. Consequently, a squared signal based upon the incoming luminance signal is available at the noninverting output terminal of the multiplier 223, while the inverse of that squared signal is available at the inverting output terminal of the multiplier 223.

The signals from the inverting and noninverting output terminals of the multiplier 223 are supplied to the normalization circuits 224 and 225, respectively. The normalization circuits 224 and 225 are part of the squaring circuit 222. The normalization circuits 224 and 225 change the D.C. level of the squared signals from the multiplier 223. Moreover, these circuits may provide a suitable amount of amplification. FIG. 7B illustrates the output signal from the normalization circuit 224 as a function of the luminance signal. The output signal from the normalization circuit 225 is the inverse of the signal shown in FIG. 7B. As explained more fully in the following description, a response curve with a square-law shape is utilized in lieu of a response curve with a step or triangular shape to avoid sharp signal transitions and undesirable video effects.

Figure 7C:
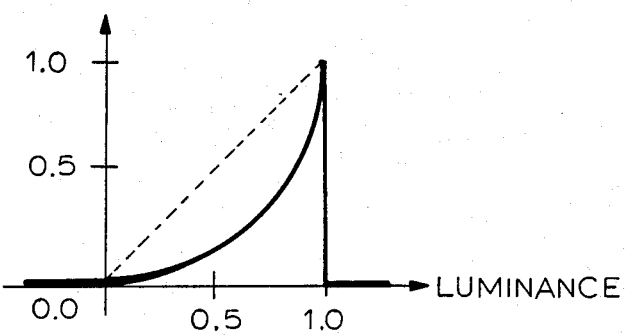
Figure 7D:
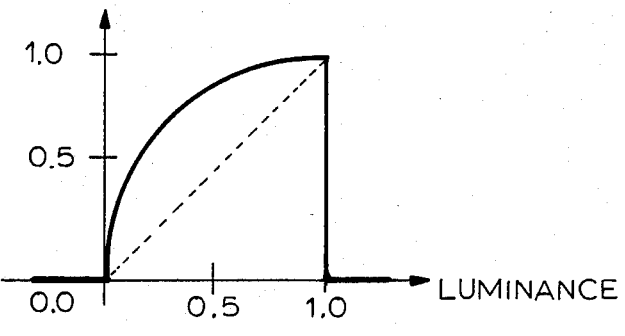

The summation circuit 226 adds the output signal from the limiting amplifier 221 and the output signal from the normalization circuit 224, while the summation circuit 228 adds the output signal from the limiting amplifier 221 and output signal from the normalization circuit 225 (which is negative). FIG. 7C depicts the output signal from the summation circuit 228 as a function of the luminance signal. FIG. 7D depicts the output signal from the summation circuit 226 as a function of the luminance signal.

Figure 7E:
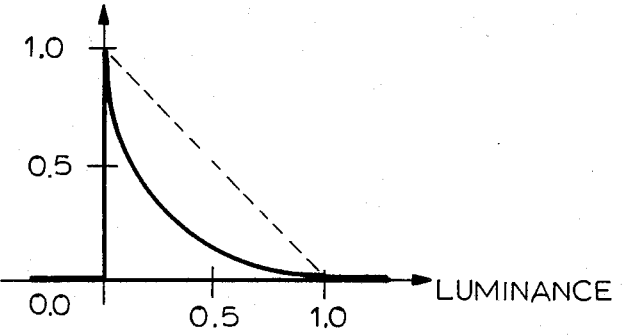

The output signal from the normalization circuit 224 is provided as the upper input to the four-quadrant multiplier 230. The output signal from the summation circuit 228 is furnished as the upper input to the four-quadrant multiplier 232. The output signal from the summation circuit 226 is subtracted from a reference signal, and this subtracted signal is supplied as the upper input to the four-quadrant multiplier 234. For purposes of explanation, this reference signal has a value of 1.0. FIG. 7E illustrates the upper input to the multiplier 234 as a function of the luminance signal.

The reference signal used for this purpose is set by a potentiometer 236, which is connected through a switch 237 to a reference voltage. The switch 237 is normally closed and is controlled by the clamping pulse. The switch 237 is closed during the picture portion of the video signal and opens during the blanking interval when the clamping pulse appears.

As noted above, each of the multipliers 230-234 receives a D.C. control signal. Thus, each of the multipliers 230-234 multiplies a luminance-dependent input signal by a D.C. control signal to produce an output signal. In particular, the multiplier 230 combines the luminance-dependent signal of FIG. 7B with the sat. middle signal. In addition, the multiplier 232 combines the luminance-dependent signal of FIG. 7C with the sat. high signal. Lastly, the multiplier 234 combines the luminance-dependent signal of FIG. 7E with the sat. low signal.

The D.C. control signals (i.e., the sat. high, sat. middle, and sat. low signals) are connected to the lower positive input terminal of each of the multipliers 230-234. The lower negative input terminals of the multipliers 230-234 are connected to the potentiometers 238-242, respectively. The potentiometers 238-242 are employed to null the multipliers 230-234. That is, the potentiometers 238-242 are adjusted to insure that the output of the associated multiplier is zero when the associated D.C. control signal is zero.

Because different luminance-dependent signals (shown in FIGS. 7B, 7C, and 7E) are supplied to each of the multipliers 230-234, the multipliers 230-234 are responsive to luminance levels in different luminance ranges. The multiplier 234 is primarily responsive to low-range luminance levels since its upper input signal (FIG. 7E) is larger for luminance levels near 0.0. The multiplier 230 is primarily responsive to mid-range luminance levels because its upper input signal (FIG. 7B) is larger for luminance levels around 0.5. The multiplier 232 is primarily responsive to high-range luminance levels since its upper input signal (FIG. 7C) is larger for luminance levels near 1.0. In other words, the sat. low signal has more of an effect on color signals with low luminance levels due to the response curve of FIG. 7E. The sat. middle signal has more of an effect on color signals with medium luminance levels due to the response curve of FIG. 7B. The sat. high signal has more of an effect on color signals with high luminance levels due to the response curve of FIG. 7C. Thus, only one of the multipliers 230-234 will be particularly effective for the video signals forming a given pixel. However, each of the multipliers 230-234 will produce some output signal (assuming that the D.C. control signals are non-zero), although two of the three output signals will be relatively small.

The luminance-dependent input signals for the multipliers 230-234 establish three luminance ranges in which the color level or saturation of color signals may be separately adjusted or corrected. The luminance-dependent input signals are all smoothly varying functions of the luminance signal, as illustrated in FIGS. 7B, 7C, and 7E, and the luminance ranges overlap one another. The use of the smoothly varying functions to define overlapping luminance ranges avoids utilization of threshold detectors and level comparators. Such components may cause sudden signal transitions, which may disadvantageously produce color discontinuities, edge distortions, fringing, and flickering. Such video effects result in an unnatural and unpleasing video picture. However, the overlapping luminance ranges established by the color level processor provide blended signal transitions and prevent such undesirable video effects.

The response curve shown in FIG. 7B is relatively broad. In order to narrow the intermediate luminance range, the sat. middle signal may be subtracted from the sat. high and sat. low signals at the multipliers 232 and 234, respectively. Specifically, the sat. middle signal is supplied as an input to the lower negative input terminal of each of the multipliers 232 and 234 through the summation circuits 233 and 235, respectively. The subtraction of the sat. middle signal from the sat. high signal at the input of the multiplier 232 alters the effect of the sat. high signal. This subtraction makes the sat. high signal more effective when the sat. middle signal is decreased and makes the sat. high signal less effective when the sat. middle signal is increased. Similarly, the subtraction of the sat. middle signal from the sat. low signal at the input of the multiplier 234 alters the effect of the sat. low signal. This subtraction makes the sat. low signal more effective when the sat. middle signal is decreased and makes the sat. low signal less effective when the sat. middle signal is increased. To summarize, the subtraction of the mid-range saturation control signal from the high-range and low-range saturation control signals essentially narrows the intermediate luminance range.

As explained above, each of the multipliers 230-234 multiplies a luminance-dependent input signal and a selectively adjustable D.C. control signal to produce an output signal. The output signals from the multipliers 230-234 are added together by a summation circuit 244 and then amplified by an amplifier 246.

As described above, the control knobs 96-100 (FIG. 2) allow the operator to correct the color level of color signals in each of three luminance ranges. The control knob 2 (FIG. 2) permits the operator to change the color level of all color signals regardless of the luminance level. The position of the control knob 102 determines the sat. master signal. The operator may vary the sat. master signal as desired to cause the saturation of all color signals—those with low luminance levels as well as those with high luminance levels—to be increased by 10 percent or decreased by 20 percent, for example, by appropriately rotating the control knob 102. Alternatively, the computer 42 (FIG. 1) may set the sat. master signal.

The sat. master signal, like the sat. high, sat. middle, and sat. low signals, is a D.C. control signal that is supplied by the serial receiver 180 (FIG. 5B). The sat. master signal is sent to a switch 248. The switch 248 is normally open and is controlled by the clamping pulse. The switch 248 is closed while the clamping pulse is present during the blanking interval and is open during the picture portion of the video signal.

When the clamping pulse appears, the switch 248 closes, and the sat. master signal is supplied to a summation circuit 250 through the switch 248. During this period, a capacitor 252 charges to the level of the sat. master signal. The capacitor 252 maintains this charge during the picture portion of the video signal. The signals from the multipliers 230-234 are added (through the summation circuit 244 and the amplifier 246) to the signal on the capacitor 252 during the picture portion of the video signal to form a combined color level control signal at the output of the summation circuit 250.

The combined color level control signal is utilized to adjust the color level of selected signals. In other words, this control signal is employed to vary the saturation of certain color signals. Based upon the signals from the multipliers 230-234, the saturation of color signals with luminance levels in one or more predetermined luminance ranges may be modified. Moreover, the saturation of all color signals may be changed based upon the sat. master signal.

The combined color level control signal is supplied as one input to each of the four-quadrant multipliers 254 and 256. A color difference signal corresponding to (B-R) is supplied as the other input to the multiplier 254, while a color difference signal corresponding to (B-G) is supplied as the other input to the multiplier 256. Each of the multipliers 254 and 256 multiplies the input color difference signal by the combined color level control signal. Each of the multipliers 254 and 256 produces normal and inverted output signals. The normal and inverted output signals from the multiplier 254 are denoted as (B-R)* and (R-B)*, respectively. The normal and inverted output signals from the multiplier 256 are designated as (B-G)* and (G-B)*, respectively.

The lower negative input terminal of the multiplier 254 is connected to a potentiometer 255, while the lower negative input terminal of the multiplier 256 is connected to potentiometer 257. The potentiometers 255-257 are employed to null the multipliers 254-256, respectively. Namely, the potentiometers 255-257 are adjusted to ensure that the outputs of the associated multiplier are zero when the combined color level control signal is zero.

Color difference signals are developed and used by the multipliers 254 and 256 to eliminate the effect of luminance on the color level correction signals. That is, luminance information is cancelled when the color difference signals are formed. Accordingly, the color level correction signals are based upon the color content of video signals, not their luminance levels.

The normal and inverted output signals from the multipliers 254 and 256 are combined in a matrix circuit 258. The matrix circuit 258 forms color level correction signals for each of the red, blue, and green color signals. The output signals from the matrix circuit 258 are denoted as $R_{clc}$, $B_{clc}$, and $G_{clc}$. These signals are employed to alter the saturation of the red, blue, and green color signals; these signals have no effect on the luminance levels of the color signals.

The $R_{clc}$, $B_{clc}$, and $G_{clc}$ color level correction signals change proportionally and linearly with the combined color level correction signal, which is supplied at the output of the summation circuit 250. Consequently, these color level correction signals change in accordance with the sat. master signal to adjust the saturation of all color signals, no matter what their luminance levels. Further, the output signals from the multipliers 230-232 vary the $R_{clc}$, $B_{clc}$, and $G_{clc}$ signals on a pixel-by-pixel basis to alter the saturation of the instantaneous color signals based upon their luminance levels.

The $R_{clc}$, $B_{clc}$, and $G_{clc}$ color level correction signals are supplied to the isolation amplifiers 260-264, respectively, and then to the summation circuits 266-270, respectively. The red, blue, and green signals from the video signal processors 144-148 (FIG. 5A) are sent through the delay lines 272-276 and the isolation amplifiers 278-282 to the other input of the summation circuits 266-270. Thus, the summation circuits 266-270 add the red, blue, and green color level correction signals to the red, blue, and green color signals to produce color level corrected signals. The color level corrected signals from the summation circuits 266-270 are amplified by the line drivers 284-288 and provided as output signals from the color level processor 220.

The luminance signal from the video signal processor 142 (FIG. 5A) passes through a delay line 290 and is amplified by a line driver 292. The output of the line driver 292 is another of the output signals from the color level processor 220.

The delay lines 272-276 and 290 are employed to compensate for the delay resulting from the color level processing circuits 221-258 in the color level processor 220. The isolation amplifiers 260-264 and 278-282 are used to prevent the output signals from the summation circuits 266-270 from affecting the input video signals, either through the path with the delay lines 272-276 or through the path with the color level processing circuits 221-258.

The output signals from the color level processor are designated as $R'_{cb}$, $B'_{cb}$, and $G'_{cb}$, and $Y'_{cb}$, as mentioned previously. The $R'_{cb}$, $B'_{cb}$, and $G'_{cb}$, and $Y'_{cb}$ signals are sent to the combiner 160 (FIG. 5A), the color separator assembly 162 (FIG. 5B), and the variable vector control circuits 184 (FIG. 5B). U.S. patent No. (to be issued from application Ser. No. 807,815) and U.S. patent No. (to be issued from application Ser. No. 943,298) describe the construction of the components that receive the $R'_{cb}$, $B'_{cb}$, and $G'_{cb}$, and $Y'_{cb}$ signals.

The color level processor 220 permits the operator to adjust the saturation of color signals with luminance levels in a given luminance range independently of color signals with luminance levels in other luminance ranges. As an example, the saturation of blue signals with low luminance levels may be modified independently of the saturation of blue signals with intermediate and high luminance levels. As a more specific example, if a video picture contains the image of a bluebird flying against a blackish background, and the blackish background contains a slight amount of blue (e.g., because the film has deteriorated over time), the saturation of the blue signals in the blackish background may be reduced to zero without affecting the saturation of the blue signals forming the bluebird. In particular, the operator would rotate the black color level control 100 (FIG. 2) to desaturate the blackish background.

The corrections developed by the color level processor 220 are different than the corrections provided by the video signal processors 142-148. For instance, the red, green, and blue gain controls 18c (FIG. 2) affect the saturation of red, green, and blue color signals, respectively, no matter what their luminance levels. By contrast, the white color level control 96 (FIG. 2) affects the saturation of red, green, and blue color signals having high luminance levels only. The white color level control 96 does not affect the saturation of color signals having intermediate or low luminance levels. The same distinction applies for the mid color level control 98 (FIG. 2) and the black color level control 100 (FIG. 2).

Referring again to FIG. 5A, the color level processor 220 is located between the video signal processors 142-148 and the correction signal generating circuits 162-172 and 184, as discussed above. Hence, the master color level control 102 (FIG. 2) modifies color signals before color corrections are generated. Previously, a master chroma control was typically arranged so that it would affect color corrected video signals. That is, the master chroma control would generally modify color signals downstream of the combiner 160 (FIG. 5A). Sometimes, however, adjustment of the master chroma control would adversely affect the video picture and necessitate the establishment of new color corrections. By making the master color level control 102 effective prior to the generation of color corrections, this interaction problem is solved. In addition, similar interaction problems are prevented by making the white, mid, and black color level controls 96, 98, and 100 (FIG. 2) effective prior to the generation of color corrections.

Auxiliary Monitor and Controls

In the embodiment shown in the drawings, the auxiliary monitor 52 displays up to twelve different video pictures, such as the video pictures 56a-56d illustrated in FIG. 1. The twelve miniature video pictures are displayed in an array with four columns and three rows. Beneath each miniature picture is a numerical display showing the frame count associated with that picture. In the alternative, this display may indicate the event number associated with that picture.

Each of the twelve video pictures on the auxiliary monitor 52 corresponds to one of the twelve picture buttons P1-P12 shown in FIG. 4. Each video picture is associated with the corrections for the scene which includes that video picture, and each of the picture buttons P1-P12 is associated with one of the video pictures. For instance, the buttons P1-P4 correspond to the video pictures 56a-56d, respectively. The picture buttons correspond to the miniature video pictures based upon their placement in the associated array.

The computer 42 (FIG. 1) stores frame count information for each of the miniature video pictures displayed on the auxiliary monitor 52. Such frame count information may be stored in predetermined locations in the computer memory.

When the operator desires to recall the corrections for the scene with the video picture 56b, for example, the operator presses the button P2 (FIG. 4), and those corrections are recalled and applied to the output of the video signal source 44 (FIG. 1). This mode of using the auxiliary monitor and the picture buttons is described in greater detail in U.S. patent No. (to be issued from application Ser. No. 943,298).

FIGS. 8A-8B show the main monitor 50 and the auxiliary monitor 52 on a larger scale than in FIG. 1. FIG. 8A illustrates the auxiliary monitor 52 after the operator has identified the corrections for two previous scenes. The operator has used video pictures 56a and 56b for identification purposes. In particular, the operator has identified the corrections for one scene with a video picture corresponding to a person's face, and the operator has identified the corrections for another scene with a video picture corresponding to a house. The image of the person's face occurred at a frame count of 0111, while the image of the house occurred at a frame count of 0248. A different video picture, i.e., a video picture from the current scene, is displayed on the main monitor 50. The operator determines the corrections for the current scene, e.g., as set forth in the above-identified patents, and now wishes to identify those corrections for later use. The operator simply presses the "store" pushbutton, which is located in the row of pushbuttons 6 (FIG. 4), and then the operator presses the button P3.

FIG. 8B illustrates what happens after the operator presses these pushbuttons. The picture on the main monitor 50 is displayed on the auxiliary monitor 52 as the video picture 56c, which corresponds to the button P3, and the frame count for the present frame, i.e., 0369, is displayed in the numerical display below the video picture 56c. At any later time the operator may press the button P3, and the corrections for the scene with the image of the dancer will be recalled and applied to the then current scene.

The operator is not required to use the video pictures on the auxiliary monitor 52 and the buttons P1-P12 to identify the corrections in any specific order. For example, the operator could have pressed the button P4 in order to identify the corrections for the current scene. If the operator had done so, the video picture of the dancer would have been displayed in location 56d instead of location 56c.

The information for producing the video pictures on the auxiliary monitor 52 (FIG. 1) is stored in the video memory 48 (FIG. 1). This information is recalled and directed to the auxiliary monitor under the control of the computer 42 (FIG. 1). The video memory can be any commercially available video picture storage device. One such device which has been used successfully is the Model ICB Image Capture Board sold by AT&T, which is a digital device for storing and retrieving video picture signals.

The video memory 48 contains sufficient storage for the twelve reduced-size video pictures 56 on the auxiliary monitor 52. If storage of more than twelve reduced-size video pictures is desired, the video memory 48 may contain additional storage for the additional video pictures. That is, the video memory 48 may contain additional pages of memory. In order to move from one page of the video memory, with an associated display of up to twelve video pictures on the auxiliary monitor, to another page of video memory, with a different display of up to twelve video pictures on the auxiliary monitor, the "page up" and "page down" pushbuttons are employed. The "page up" and "page down" pushbuttons are located in the row of pushbuttons 36 in FIG. 4.

"Call-A-Loc" Feature

The "Call-A-Loc" feature permits the operator to instruct the video signal source 44 (FIG. 1) to position the image recording medium to a selected location. For convenience, the video signal source is referred to as a telecine in the following description. The telecine operates with a motion picture film, which is to be transferred to videotape. The "Call-A-Loc" feature may be used to readily position the film in the telecine to a desired film frame. The "Call-A-Loc" feature may be employed to control other types of video signal sources, too. In the embodiment shown in the drawings, the picture buttons P1-P12 (FIG. 4) and the "cue" pushbutton (FIG. 3) on the control panel are used in conjunction with the auxiliary monitor 52 (FIGS. 1 and 8) to implement the "Call-A-Loc" feature.

At times, an operator will desire to move the motion picture film in the telecine to the particular frame corresponding to one of the pictures displayed on the auxiliary monitor 52. The "Call-A-Loc" feature enables the operator to readily control the telecine so that it automatically moves the film to the selected frame. Specifically, the operator presses one of the picture buttons P1-P12 (FIG. 4) and then the "cue" pushbutton (FIG. 3) in this order. In response to the actuation of these controls, the computer 42 (FIG. 1) automatically causes the telecine to roll the film forward or backward to the frame corresponding to the picture button that was pushed.

As part of its control function, the computer reads the frame count information associated with the picture button that was pushed. The computer receives frame pulses and a direction signal from the telecine. The direction signal denotes whether the film is moving forward or backward. The computer compares the desired frame count with the actual frame count, which is calculated based upon the frame pulses and the direction signal, to determine when the desired frame is in position. When the desired frame is in position, the computer 42 stops the telecine, and a video picture corresponding to the desired frame will appear on the main monitor 50.

FIGS. 8A-8B may be used to provide an example of how the "Call-A-Loc" feature is employed. If the operator wishes to roll the film to the frame corresponding to the picture of the house (in location 56b on the auxiliary monitor the operator simply depresses the P2 button (FIG. 4) and the "cue" pushbutton (FIG. 3). The computer then automatically controls the telecine to move the film so that the frame with the house produces the video picture on the main monitor 50.

Flowchart

Figure 9:
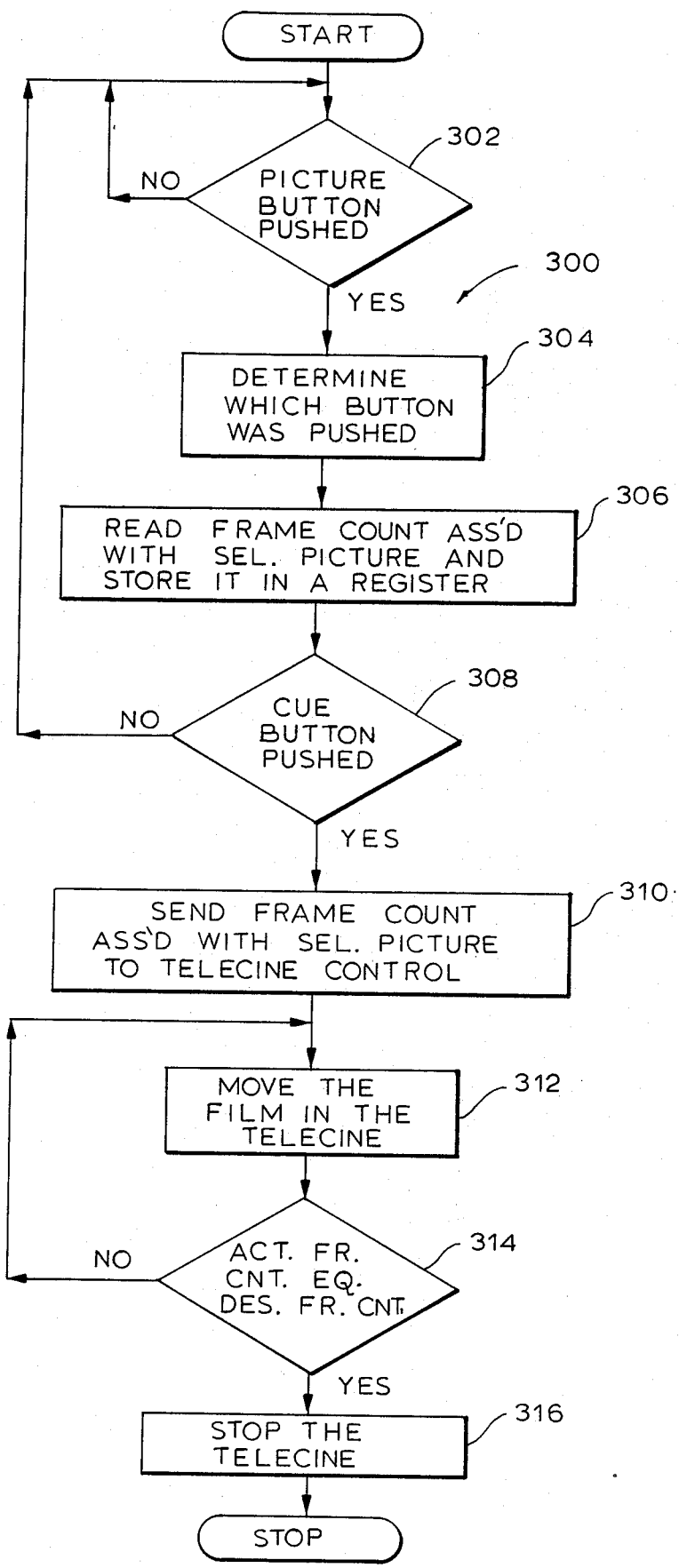
FIG. 9 is a flowchart of a computer program that may be employed to implement the "Call-A-Loc" feature of the invention.

FIG. 9 of the drawings is a flowchart illustrating a computer program that may be used to carry out the "Call-A-Loc" feature of the invention. The routine is generally designated by the reference numeral 300.

Initially, the routine checks whether one of the picture buttons P1–P12 (FIG. 4) has been pressed, as indicated by the decision block 302. If so, the routine determines which picture button has been operated, as denoted by 304. However, if a picture button has not been pushed, the routine returns to the start and continues to check the keyboard.

After ascertaining which picture button was actuated, the routine reads the frame count information (or other location information) associated with that button and stores such information in a temporary storage location, as shown at 306. Next, the routine inquires whether the "cue" pushbutton has been operated, as depicted by the decision block 308. If the "cue" pushbutton has not been pressed, the routine returns to the start and waits for the actuation of a picture button. If the routine determines that the "cue" pushbutton has been pressed, the routine sends the temporarily stored frame count information (or other location information) to the video signal source control section of the computer, as denoted by 310.

The routine then causes the computer to move the film in the telecine (or the image recording medium in another video signal source) forward or backward, as depicted at 312. When the telecine is moving the film, the routine decides whether the actual frame count equals the desired frame count, as indicated by the decision block 314. If so, the routine causes the computer to stop the telecine, as illustrated at 316. Otherwise, the routine keeps the film in the telecine moving toward the desired frame.

Other Variations

To provide the "Call-A-Loc" feature, the auxiliary monitor 52 (FIG. 1) may include a "touch screen." If so, the operator merely touches the miniature video picture associated with the desired image in order to control the video signal source 44 (FIG. 1). This implementation of the "Call-A-Loc" feature eliminates the picture buttons P1–P12 (FIG. 4) and results in a less complicated keyboard. Alternatively, a light pen or a "mouse" may be utilized to carry out the "Call-A-Loc" feature.

The color level processor may be used with a window generator circuit, such as the window generator circuits shown described in U.S. Pat. Nos. 4,679,067 and 4,694,329. For example, a window generator circuit may be used to control a switch in the line between the summation circuit 250 and the multipliers 254 and 256 in FIG. 6A. The combined color level control signal is present on this line.

The color level processor is illustrated and explained with analog signal processing circuits, but a suitably programmed general purpose computer or microprocessor may be employed in lieu of the analog signal processing circuits. In addition, digital circuits may be used for other analog components in the color corrector.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

We claim:

1. Apparatus for color correcting video picture signals, said video picture signals including luminance and color signals, said apparatus comprising:
   control signal means, responsive to the luminance signal, for establishing a plurality of luminance ranges and for producing a plurality of control signals, the control signals being associated with the luminance ranges, the luminance ranges overlapping one another, each of the control signals being a different function of the luminance signal;
   color level correction means, responsive to said control signal means, for selectively developing color level correction signals based upon the control signals from said control signal means; and
   means for applying the color level correction signals to the color signals.

2. Apparatus as recited in claim 1, wherein each of the control signals from said control signal means is a different smoothly varying function of the luminance signal.

3. Apparatus as recited in claim 2, wherein each function produces a nonzero control signal over a substantially full spectrum of luminance levels.

4. Apparatus as recited in claim 1, wherein said control signal means includes:
   first function generator means, having a first transfer function corresponding to a high luminance range, for producing a first control signal;
   second function generator means, having a second transfer function corresponding to a middle luminance range, for producing a second control signal; and
   third function generator means, having a third transfer function corresponding to a low luminance range, for producing a third control signal.

5. Apparatus as recited in claim 4, wherein said control signal means includes first modifying means for modifying the sign and magnitude of the first control signal based upon a first selectively adjustable signal, second modifying means for modifying the sign and magnitude of the second control signal based upon a second selectively adjustable signal, and third modifying means for modifying the sign and magnitude of the third control signal based upon a third selectively adjustable signal.

6. Apparatus as recited in claim 5, wherein said first modifying means and said third modifying means are partially responsive to the second selectively adjustable signal.

7. Apparatus as recited in claim 1, further comprising means for producing a selectively adjustable overall level correction signal, wherein said color level correction means is responsive to the overall level correction signal and develops color level correction signals based upon the overall level correction signal as well as the control signals from said control signal means.

8. Apparatus as recited in claim 1, wherein said color level correction means is responsive to the color signals.

9. Apparatus as recited in claim 8, wherein said color level correction means includes first modifying means for modifying the sign and magnitude of a first color difference signal based upon the control signals from said control signal means and second modifying means for modifying the sign and magnitude of a second color difference signal based upon the control signals from said control signal means.

10. Apparatus as recited in claim 9, wherein said color level correction means includes matrix means, responsive to said first and second modifying means, for forming the color level correction signals.

11. A method for color correcting video picture signals, said video picture signals including luminance and color signals, said method comprising the steps of:
establishing a plurality of luminance ranges, the luminance ranges overlapping one another;
producing a plurality of control signals, the control signals being associated with the luminance ranges, each of the control signals being a different function of the luminance signal;
selectively developing color level correction signals based upon the control signals; and
applying the color level correction signals to the color signals.

12. A method as recited in claim 11, wherein the producing step includes producing control signals which are each different smoothly varying functions of the luminance signal.

13. A method as recited in claim 12, wherein the producing step includes producing nonzero control signals over a substantially full spectrum of luminance levels for each of the luminance ranges.

14. A method as recited in claim 11, wherein the establishing step includes developing a first transfer function corresponding to a high luminance range, developing a second transfer function corresponding to a middle luminance range, and developing a third transfer function corresponding to a low luminance range.

15. A method as recited in claim 14, wherein the producing step includes:
modifying the sign and magnitude of a first control signal based upon a first selectively adjustable signal, said first control signal corresponding to the high luminance range;
modifying the sign and magnitude of a second control signal based upon a second selectively adjustable signal, said second control signal corresponding to the middle luminance range; and
modifying the sign and magnitude of a third control signal based upon a third selectively adjustable signal, said third control signal corresponding to the low luminance range.

16. A method as recited in claim 15, wherein the producing step includes modifying the sign and magnitude of the first and third control signals based in part upon the second selectively adjustable signal.

17. A method as recited in claim 11, further comprising the step of producing a selectively adjustable overall level correction signal, wherein the developing step includes developing color level correction signals based upon the overall level correction signal along with the control signals.

18. A method as recited in claim 11, wherein the developing step includes developing color level correction signals based upon color signals.

19. A method as recited in claim 18, wherein the developing step includes the steps of modifying the sign and magnitude of a first color difference signal based upon the control signals and modifying the sign and magnitude of a second color difference signal based upon the control signals.

20. Apparatus for color correcting video picture signals, comprising:
signal producing means for producing signals indicative of luminance and signals indicative of color;
color level adjustment means, responsive to said luminance-indicative signals, for selectively adjusting the levels of said color-indicative signals as a function of said luminance-indicative signals to produce level-corrected color signals;
color correction means, connected to receive said level-corrected color signals, for selectively generating color correction signals for said level-corrected color signals; and
summing means for adding said level-corrected color signals and said color correction signals.

21. Apparatus as recited in claim 20, wherein said signal producing means includes decoder means for producing red, green, and blue color signals and means for developing a luminance signal.

22. Apparatus as recited in claim 20, wherein said color correction means includes means for selecting a predetermined range of colors around an infinitely variable principal color and means for selectively generating color correction signals for level-corrected color signals corresponding to the predetermined range of colors.

23. Apparatus as recited in claim 20, wherein said color correction means includes means for selectively generating hue, saturation, and luminance correction signals for level-corrected color signals in six color bands, said color bands being centered about the six primary and secondary colors, i.e., red, green, blue, magenta, cyan, and yellow.

24. Apparatus as recited in claim 20, wherein said color level adjustment means includes:
control signal means, responsive to said luminance-indicative signals, for establishing a plurality of luminance ranges and producing a plurality of control signals, the control signals being associated with the luminance ranges, the luminance ranges overlapping one another, each of the control signals being a different function of the luminance signal;
color level correction means, responsive to said control signal means, for selectively developing color level correction signals based upon said control signals; and
means for applying said color level correction signals to said color-indicative signals to form said level-corrected color signals.

25. A method for color correcting video picture signals, comprising the steps of:
producing signals indicative of luminance and signals indicative of color;
selectively adjusting the levels of said color-indicative signals as a function of said luminance-indicative signals to produce level-corrected color signals;
selectively generating color correction signals for said level-corrected color signals; and
adding said color correction signals to said level-corrected color signals.

26. A method as recited in claim 25, wherein the producing step includes producing red, green, and blue color signals and developing a luminance signal.

27. A method as recited in claim 25, wherein the color correction generating step includes selecting a predetermined range of colors around an infinitely variable principal color and selectively generating color correction signals for level-corrected color signals corresponding to the predetermined range of colors.

28. A method as recited in claim 25, wherein the color correction generating step includes selectively generating hue, saturation, and luminance correction signals for level-corrected color signals in six color bands, said color bands being centered about the six primary and secondary colors, i.e., red, green, blue, magenta, cyan, and yellow.

29. A method as recited in claim 25, wherein the level adjusting step includes:
    establishing a plurality of luminance ranges, the luminance ranges overlapping one another;
    producing a plurality of control signals, the control signals being associated with the luminance ranges, each of the control signals being a different function of the luminance signal; and
    selectively developing color level correction signals based upon said control signals; and
    applying said color level correction signals to said color-indicative signals to form said level-corrected color signals.

30. Apparatus for color correcting video picture signals, comprising:
    signal producing means for producing signals indicative of luminance and signals indicative of color;
    color level adjustment means, for selectively adjusting the levels of all color-indicative signals regardless of the levels of said luminance-indicative signals to produce level-corrected color signals;
    color correction means, connected to receive said level-corrected color signals, for selectively generating color correction signals for said level-corrected color signals; and
    summing means for adding said level-corrected color signals and said color correction signals.

31. Apparatus as recited in claim 30, wherein said color level adjustment means includes:
    means for supplying a selectively adjustable level control signal;
    first multiplication means for multiplying said level control signal by a first color difference signal;
    second multiplication means for multiplying said level control signal by a second color difference signal;
    matrix means for combining signals from said first and second multiplication means and for forming color level correction signals; and
    summing means for adding said color level correction signals and said color-indicative signals to produce said level-corrected color signals.

32. A method for color correcting video picture signals, comprising the steps of:
    producing signals indicative of luminance and signals indicative of color;
    selectively adjusting the levels of all color-indicative signals regardless of the levels of said luminance-indicative signals to produce level-corrected color signals;
    selectively generating color correction signals for said level-corrected color signals; and
    adding said color correction signals to said level-corrected color signals.

33. A method as recited claim 32, wherein the level adjusting step includes:
    supplying a selectively adjustable level control signal;
    multiplying said level control signal by a first color difference signal;
    multiplying said level control signal by a second color difference signal;
    combining the multiplied signals to form color level correction signals; and
    adding said color level correction signals and said color-indicative signals to produce said level-corrected color signals.

34. A color correction system for color correcting video picture signals representative of images stored in an image recording medium and displayed as video pictures on a display means, comprising:
    means for producing signals indicative of luminance and signals indicative of color;
    color level correction means, responsive to said luminance-indicative signals, for selectively generating level correction signals for said color-indicative signals, said level correction signals being generated as a function of said luminance-indicative signals;
    color correction means, responsive to said color level correction means, for selectively generating color correction signals for said level-corrected color-indicative
    storage means for storing said level correction signals and said color correction signals;
    scene location means for producing location signals representative of the location of an initial image of each of a plurality of scenes recorded on said image recording medium;
    means for storing said location signals in said storage means;
    readout means for reading from said storage means said level correction signals, said color correction signals, and said location signals; and
    combining means, responsive to said location signals read from said storage means, for selectively combining level correction signals read from said storage means with said color-indicative signals and for selectively combining color correction signals read from said storage means with said level-corrected color-indicative signals.

35. A method for color correcting video picture signals representative of images stored in an image recording medium and displayed as video pictures on a display means, said method comprising the steps of:
    producing signals indicative of luminance and signals indicative of color;
    selectively generating level correction signals for said color-indicative signals, said level correction signals being generated as a function of said luminance-indicative signals;
    selectively generating color correction signals for said level-corrected color-indicative signals;
    storing said level correction signals and said color correction signals in a storage means;
    producing location signals representative of the location of an initial image of each of a plurality of scenes recorded on said image recording medium;
    storing said location signals in said storage means;
    reading from said storage means said level correction signals, said color correction signals, and said location signals;
    selectively combining, in response to location signals read from said storage means, level correction signals read from said storage means with said color-indicative signals; and
    selectively combining, in response to location signals read from said storage means, color correction signals read from said storage means with said level-corrected color-indicative signals.

* * * * *